April 15, 1947.  C. E. BENNETT  2,419,053
BUOYANT ELECTRIC CABLE
Filed July 3, 1942  2 Sheets-Sheet 1
Fig.1.
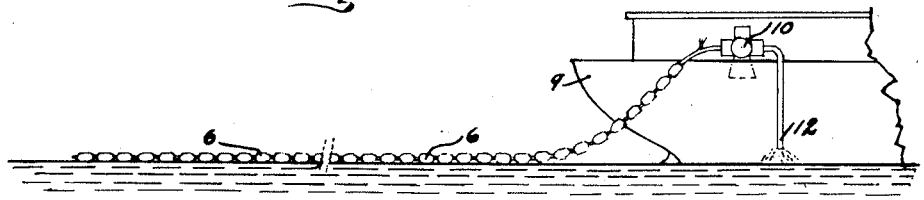
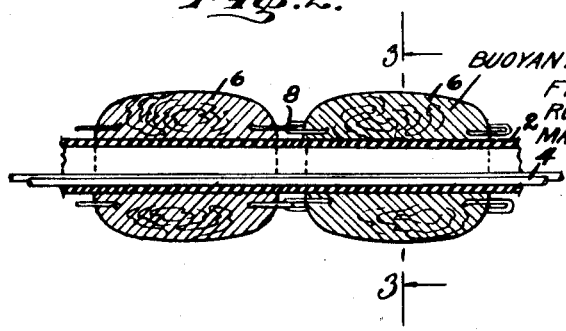 
Fig.2.  Fig.3.
Fig.4.  Fig.5.  Fig.6.
 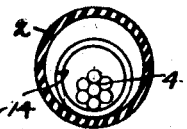 
Fig.7.
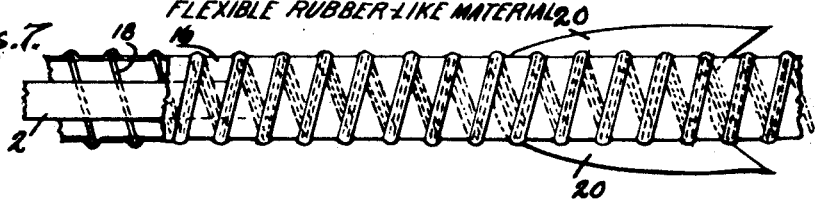
INVENTOR
Charles E. Bennett
BY
James C. Bethell
ATTORNEY April 15, 1947.  C. E. BENNETT  2,419,053
BUOYANT ELECTRIC CABLE
Filed July 3, 1942  2 Sheets-Sheet 2
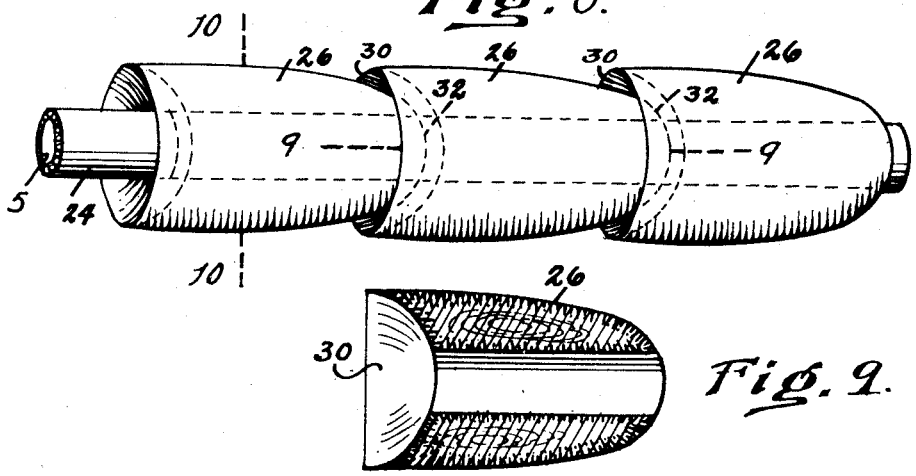
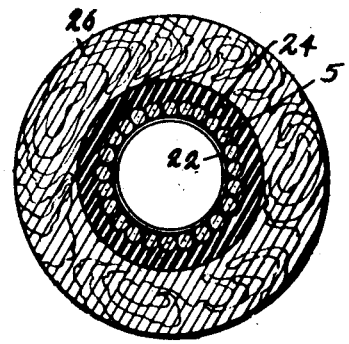
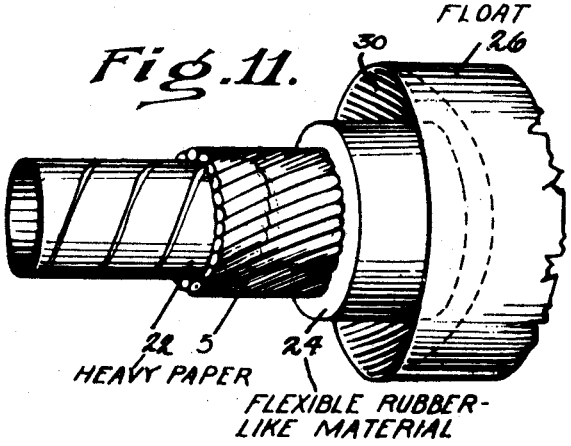
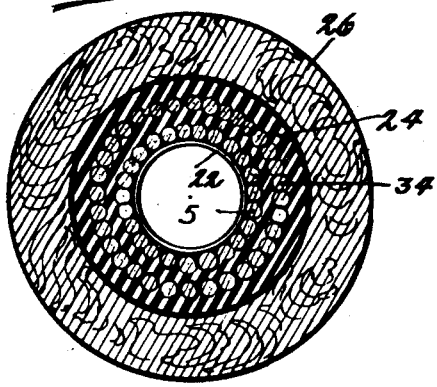
INVENTOR
Charles E. Bennett
BY
James G. Beckell
ATTORNEY Patented Apr. 15, 1947

2,419,053

UNITED STATES PATENT OFFICE 2,419,053

BUOYANT ELECTRIC CABLE

Charles E. Bennett, Ridgewood, N. J., assignor to The Okonite-Callender Cable Company, Incorporated, Paterson, N. J., a corporation of New Jersey Application July 3, 1942, Serial No. 449,574

3 Claims. (Cl. 174—.15)

This invention relates to an improvement in electric cables capable of readily floating in sea water.

It is one of the objects of my invention to provide a cable of this general type which is so constructed as readily to withstand the rough usage to which such cables are subjected.

Another object of the invention is to provide a buoyant cable of the general type above referred to which possesses the necessary flexibility to permit the same to be handled and reeled without difficulty.

A further object of my invention is the provision of a buoyant electric cable wherein the buoyancy of the cable may be varied and wherein means are provided for cooling the cable conductor or conductors thereby to increase the carrying capacity thereof.

More specifically the present invention provides a construction wherein the cable is provided with a continuous hollow core through which water can be passed for cooling the cable conductor or conductors, this arrangement also providing for varying the buoyancy of the cable.

Generally speaking, my improved cable comprises a continuous length of flexible tubing of rubber or rubberlike material. The bare conductor or conductors of the cable extend through this tubing or they may be embedded in the walls thereof. Threaded upon this tubing are buoyant floats or in some cases another tubing, the weight to volume ratio of which is such that the cable will float. These floats or the additional tubing mentioned in addition to their function as a buoyant medium have the further function of protecting the cable against injury.

In the accompanying drawings wherein I have illustrated several embodiments of my invention:

Fig. 1 is a diagrammatic view showing my improved structure attached to or being towed by a ship;

Fig. 2 is a view in cross section of a short length of the cable of Fig. 1;

Fig. 3 is a section on the line 3—3 of Fig. 2;

Figs. 4, 5 and 6 are cross sectional views of modifications of the embodiment of the invention illustrated in Fig. 2;

Fig. 7 is a view of still another modified embodiment of my invention in which I have provided a construction wherein the floats of Fig. 2, for instance, are eliminated;

Fig. 8 is a short section of cable in elevation showing a further embodiment of my invention;

Fig. 9 is a section on the line 9—9 of Fig. 8;

Fig. 10 is a section on the line 10—10 of Fig. 8;

Fig. 11 is an elevational view of the cable of Fig. 10; and

Fig. 12 is a cross sectional view of a cable similar to the one shown in Fig. 10 but employing two conductors.

Referring to the drawings in detail and first of all to Figs. 1, 2 and 3: The cable of this embodiment of my invention comprises a continuous flexible tube 2 which may be of rubber—natural or synthetic—or other flexible rubber-like insulating material. Extending through the tubing 2 are bare or naked conductors 4.

To provide the weight to volume ratio necessary to make the cable buoyant, floats 6 are strung or threaded on the tubing 2. These floats are of wood or of treated wood pulp or any other suitable buoyant material and are cemented to the tubing 2. The floats are connected together by links 8 which are of such construction as not detrimentally to affect the flexibility of the cable so that the cable may be readily reeled or moved about. In addition to supporting the cable in water, the floats afford a certain amount of mechanical protection against damage to the tubing 2 from drawing the same over the rail of the ship 9 or from heavy weights being dropped upon the cable, etc. It will be appreciated, also, that by cementing the floats to the tubing 2 and by joining the floats to each other the tensile strain on the cable will be taken up by the tubing and floats thereby relieving the conductors 4.

10 designates a water pump mounted on the ship 9 to which the inboard end of the cable is attached. This pump has a discharge line 12 extending overboard. The pump 10 is provided primarily for the purpose of drawing water through the tubing 2 for cooling the conductors 4, the water being discharged overboard in the form of a spray. I have found that by so cooling the conductors I very materially increase their current carrying capacity so that I can carry 2000 amperes, for example, on a conductor composed of only three #6 wires. As an alternative, an insulated tank and pump can be provided on shipboard and this tank can be filled with seawater, and then discharged through the cable core. The hollow core provided by the tubing 2 has a further function in that by varying the amount of water pumped through the core 2 the buoyancy of the cable can be varied.

In the construction shown in Fig. 4 I provide a cable which in the main is the same as that just described except that in this instance instead of merely employing naked conductors 4 lying side by side in the tubing 2, the conductors are stranded.

In the embodiment of my invention shown in Fig. 5 I employ the tubing 2 the same as before, but in this embodiment of the invention I place another tube 14 of rubber or rubber-like material within the tube 2 and of considerably smaller diameter than the tube 2, the tube 14 receiving the conductors. The water for cooling the conductors is pumped through the tube or core 14. The space between the tubes 14 and 2, of course, is filled with air.

In Fig. 6 I show a construction similar to Fig. 5 except that in this case the conductors 4 are embedded in the walls of the tube 14.

In the embodiment of my invention illustrated in Fig. 7 I have eliminated the floats 6 although retaining the hollow core or tubing 2 and the conductor arrangement, etc. described in connection with Figs. 1 to 6, inclusive. In the construction of Fig. 7 the hollow core and conductor assembly extends through a reinforced waterproof hose 16 of relatively large diameter. It is flexible and is composed of rubber or rubber-like material or a combined canvas and rubber-like material reinforced with wire 18 which is embedded in the wall of the hose. This wire extends helically of the hose as is quite apparent from the drawing. It will be appreciated and understood, of course, that this hose 16 is sufficiently buoyant to enable the cable to float in water. In order that the cable may be somewhat controlled so far as the depth to which it is submerged is concerned, I may equip the same externally with fins 20. Although I have shown but one pair of these fins in the drawing, it will be understood, of course, that there may be as many pairs as may be found desirable.

Referring next to the embodiment of my invention as illustrated in Figs. 8, 9, 10 and 11: In this embodiment of the invention I provide a central tubular core member 22. This member 22 is an open helix of any suitable material such as heavy paper, for example. The wires or strands composing the conductor 5 are laid up about the exterior of this core member 22. From Fig. 10, it will be seen that the strands of the conductor 5 are embedded in and surrounded by a fairly thick flexible wall 24 of rubber—natural or synthetic—or other suitable flexible rubber-like insulating material. Threaded upon this sheath 24 and cemented thereto are a plurality of floats 26 which may be made of various materials such, for example, as wood pulp impregnated with hot terpin hydrate, for instance, or other suitable material for rendering the same highly water resistant.

In order that the cable may possess the desired flexibility the adjacent ends of the buoyant members or floats 26 are shaped to provide a flexible joint, the end of one float being concave, as shown at 30, while the adjacent end of the next float is convex, as shown at 32.

The construction illustrated in Fig. 12 is the same as that just described except that in this case I employ a second conductor which I have designated 34, the strands of this conductor as well as the strands of the conductor 5 being embedded in the rubber-like insulating material 24 by which the two conductors are insulated from each other.

It will be appreciated, of course, that in the two embodiments of my invention last described, cooling water will be pumped through the cable core.

It is to be understood that changes may be made in the details of construction and arrangement of parts as herein shown and described without departing from the spirit and scope of my invention.

What I claim is:

1. An electric cable in which the weight to volume ratio is such as to render the same buoyant, said cable comprising in combination a continuous water pervious tubular member, conductor strands laid up about said tubular member or core, a sheath of insulating material about said conductor strands, and floats threaded upon said sheath and rigidly secured thereto, the adjacent ends of said floats telescoping each other while permitting of their relative angular movement to provide a flexible structure.

2. An electric cable in which the weight to volume ratio is such as to render the same buoyant in water, said cable comprising in combination a continuous water pervious tubular member, conductor strands laid up about said tubular member, a sheath of insulating material about said conductor strands and in which the strands are embedded, and floats threaded upon said sheath and rigidly secured thereto, the adjacent ends of the floats telescoping each other while permitting of their relative angular movement to provide a flexible structure.

3. An electric cable in which the weight to volume ratio is such as to render the same buoyant in water, said cable comprising in combination a continuous water pervious tubular member, means for forcing water along the interior of said tubular member, conductor strands, laid up about said tubular member, a sheath of insulating material about the conductor strands and in which the strands are embedded, and floats threaded upon said sheath and rigidly secured thereto, the adjacent ends of said floats telescoping each other while permitting of their relative angular movement to provide a flexible structure.

CHARLES E. BENNETT.

REFERENCES CITED

The following references are of record in the file of this patent:

UNITED STATES PATENTS

| Number | Name | Date |
| --- | --- | --- |
| 2,203,894 | Cooke | June 11, 1940 |
| 511,188 | Barnard | Dec. 19, 1893 |
| 1,882,320 | Hapgood | Oct. 11, 1932 |
| 2,035,088 | McNamee | Mar. 24, 1936 |
| 2,048,811 | Peirce | July 28, 1936 |
| 642,738 | Borel | Feb. 6, 1900 |
| 2,222,574 | Robertson | Nov. 19, 1940 |
| 1,750,757 | Johnson | Mar. 18, 1930 |
| 411,161 | Maynard | Sept. 17, 1889 |
| 941,111 | Tasto | Nov. 23, 1909 |
| 2,157,377 | Zink | May 9, 1939 |
| 2,197,544 | Atkinson | Apr. 16, 1940 |